United States Patent
Jayakumar et al.

(10) Patent No.: US 9,443,053 B2
(45) Date of Patent: Sep. 13, 2016

(54) SYSTEM FOR AND METHOD OF PLACING CLOCK STATIONS USING VARIABLE DRIVE-STRENGTH CLOCK DRIVERS BUILT OUT OF A SMALLER SUBSET OF BASE CELLS FOR HYBRID TREE-MESH CLOCK DISTRIBUTION NETWORKS

(71) Applicant: XPLIANT, Inc., San Jose, CA (US)

(72) Inventors: Nikhil Jayakumar, Sunnyvale, CA (US); Vivek Trivedi, Fremont, CA (US); Vasant K. Palisetti, Santa Clara, CA (US); Bhagavati R. Mula, San Jose, CA (US); Daman Ahluwalia, Los Gatos, CA (US); Amir H. Motamedi, Sunnyvale, CA (US)

(73) Assignee: Cavium, Inc., San Jose, CA (US)

( * ) Notice: Subject to any disclaimer, the term of this patent is extended or adjusted under 35 U.S.C. 154(b) by 149 days.

(21) Appl. No.: 14/141,096

(22) Filed: Dec. 26, 2013

(65) Prior Publication Data
US 2015/0186589 A1 Jul. 2, 2015

(51) Int. Cl.
*G06F 17/50* (2006.01)

(52) U.S. Cl.
CPC ....... *G06F 17/5077* (2013.01); *G06F 17/5072* (2013.01); *G06F 17/5009* (2013.01); *G06F 2217/62* (2013.01); *G06F 2217/84* (2013.01)

(58) Field of Classification Search
CPC ........... G06F 17/5072; G06F 17/5077; G06F 17/5009; G06F 2217/62; G06F 2217/84
USPC .......................... 716/114, 118, 119, 124, 126
See application file for complete search history.

(56) References Cited

U.S. PATENT DOCUMENTS

| | | | |
|---|---|---|---|
| 5,914,625 A | 6/1999 | Shirata | |
| 5,977,810 A | 11/1999 | Shirata | |
| 6,166,564 A | 12/2000 | Rosen | |
| 6,434,731 B1 | 8/2002 | Brennan et al. | |
| 6,574,781 B1 | 6/2003 | Harada et al. | |
| 6,609,241 B2 | 8/2003 | Yonemori | |
| 6,629,298 B1 | 9/2003 | Camporese et al. | |
| 6,657,130 B2 * | 12/2003 | Van Dyke | H01L 23/49822 174/255 |
| 6,678,644 B1 * | 1/2004 | Segal | G06F 17/5031 703/15 |
| 6,698,006 B1 * | 2/2004 | Srinivasan | G06F 1/10 716/114 |
| 6,763,513 B1 | 7/2004 | Chang et al. | |
| 6,951,002 B2 | 9/2005 | Clabes et al. | |
| 6,981,233 B2 * | 12/2005 | Chang | G06F 17/5045 716/113 |
| 7,089,520 B2 * | 8/2006 | Voldman | G06F 17/5068 716/112 |
| 7,117,466 B2 * | 10/2006 | Kalafala | G06F 17/5031 716/108 |
| 7,334,209 B1 * | 2/2008 | Roberts | G06F 17/5045 716/117 |

(Continued)

*Primary Examiner* — Helen Rossoshek
(74) *Attorney, Agent, or Firm* — Haverstock & Owens LLP

(57) ABSTRACT

Clock stations in a hybrid tree-mesh clock distribution network are placed and routed using placement information embedded in instance names of the macrocells that form the clock-distribution network. The instance name includes (X,Y) coordinate information corresponding to placement of the macrocell in the physical layout of the network design. Base cells in each macrocell are placed in a known deterministic arrangement, such as one on top of another in a layout of the clock distribution network, all at the same (X,Y) offset. Preferably, the base cells are all from a standard-cell library, thereby reducing design cost and debug.

23 Claims, 17 Drawing Sheets

(56) References Cited

U.S. PATENT DOCUMENTS

| | | | |
|---|---|---|---|
| 7,392,495 B1* | 6/2008 | Cherukupalli | G06F 17/5068 716/114 |
| 7,546,567 B2* | 6/2009 | Cheon | G06F 17/5077 716/113 |
| 7,810,061 B2 | 10/2010 | Minonne et al. | |
| 7,870,521 B2* | 1/2011 | Palisetti | G06F 17/5036 716/106 |
| 8,205,182 B1 | 6/2012 | Zlatanovici | G06F 17/505 703/16 |
| 8,239,799 B2* | 8/2012 | Riviere-Cazaux | G06F 17/5072 716/113 |
| 8,266,569 B2* | 9/2012 | Palisetti | G06F 17/10 703/2 |
| 8,536,921 B2* | 9/2013 | Gasper | H03H 11/265 327/170 |
| 8,629,548 B1* | 1/2014 | Andreev | G06F 1/10 257/691 |
| 8,683,416 B1* | 3/2014 | Trivedi | G06F 17/505 716/118 |
| 8,739,103 B1* | 5/2014 | Dutta | G06F 17/5054 716/111 |
| 8,775,996 B2* | 7/2014 | Alpert | G06F 17/5036 716/106 |
| 8,887,117 B1* | 11/2014 | Chuang | G06F 17/5077 716/124 |
| 2004/0168140 A1 | 8/2004 | Chang | |
| 2006/0080632 A1* | 4/2006 | Ng | G06F 17/5068 716/116 |
| 2008/0229266 A1 | 9/2008 | Bueti | |
| 2008/0276212 A1* | 11/2008 | Albrecht | G06F 17/505 716/122 |
| 2008/0317050 A1* | 12/2008 | Xiong | H04L 12/185 370/401 |
| 2009/0195274 A1 | 8/2009 | Ohyabu | |
| 2009/0199142 A1* | 8/2009 | Arunachalam | G06F 17/5072 716/132 |
| 2010/0023898 A1 | 1/2010 | Nomura et al. | |
| 2011/0046937 A1 | 2/2011 | Kanno | |
| 2011/0167396 A1* | 7/2011 | Riviere-Cazaux | G06F 17/5072 716/108 |
| 2011/0260318 A1* | 10/2011 | Eisenstadt | G06F 17/5054 257/737 |
| 2012/0216168 A1 | 8/2012 | Buechner et al. | |
| 2012/0266120 A1 | 10/2012 | Buechner et al. | |
| 2013/0020707 A1 | 1/2013 | Or-bach et al. | |
| 2013/0043923 A1 | 2/2013 | Gasper et al. | |
| 2013/0046518 A1* | 2/2013 | Mejdrich | G06T 1/20 703/2 |
| 2013/0047127 A1* | 2/2013 | Arunachalam | G06F 17/5072 716/103 |
| 2013/0069703 A1 | 3/2013 | Gasper et al. | |
| 2014/0028348 A1 | 1/2014 | Andreev et al. | |
| 2014/0143746 A1* | 5/2014 | Alpert | G06F 17/5036 716/114 |
| 2015/0171079 A1* | 6/2015 | Or-Bach | H03K 19/096 257/368 |
| 2015/0186560 A1* | 7/2015 | Jayakumar | G06F 17/505 327/297 |
| 2015/0186583 A1 | 7/2015 | Jayakumar et al. | |
| 2015/0186589 A1 | 7/2015 | Jayakumar et al. | |
| 2015/0227646 A1* | 8/2015 | Arunachalam | G06F 17/505 716/104 |

* cited by examiner

```
module xp_ckinvx0 ( A ) ;
input A ;
stdcell_ckinv_x16  xinv1 ( .A(A), .Q(float1) ) ;
stdcell_ckinv_x12  xinv2 ( .A(A), .Q(float2) ) ;
stdcell_ckinv_x8   xinv3 ( .A(A), .Q(float3) ) ;
stdcell_ckinv_x12  xinv4 ( .A(A), .Q(float4) ) ;
stdcell_ckinv_x16  xinv5 ( .A(A), .Q(float5) ) ;
endmodule // xp_ckinvx0 module xp_ckinvx8 ( A , Z ) ;
input A ;
output Z ;
stdcell_ckinv_x16  xinv1 ( .A(A), .Q(float1) ) ;
stdcell_ckinv_x12  xinv2 ( .A(A), .Q(float2) ) ;
stdcell_ckinv_x8   xinv3 ( .A(A), .Q(Z) ) ;
stdcell_ckinv_x12  xinv4 ( .A(A), .Q(float4) ) ;
stdcell_ckinv_x16  xinv5 ( .A(A), .Q(float5) ) ;
endmodule // xp_ckinvx8 module xp_ckinvx12 ( A , Z ) ;
input A ;
output Z ;
stdcell_ckinv_x16  xinv1 ( .A(A), .Q(float1) ) ;
stdcell_ckinv_x12  xinv2 ( .A(A), .Q(float2) ) ;
stdcell_ckinv_x8   xinv3 ( .A(A), .Q(float3) ) ;
stdcell_ckinv_x12  xinv4 ( .A(A), .Q(Z) ) ;
stdcell_ckinv_x16  xinv5 ( .A(A), .Q(float5) ) ;
endmodule // xp_ckinvx12 module xp_ckinvx16 ( A , Z ) ;
input A ;
output Z ;
stdcell_ckinv_x16  xinv1 ( .A(A), .Q(float1) ) ;
stdcell_ckinv_x12  xinv2 ( .A(A), .Q(float2) ) ;
stdcell_ckinv_x8   xinv3 ( .A(A), .Q(float3) ) ;
stdcell_ckinv_x12  xinv4 ( .A(A), .Q(float4) ) ;
stdcell_ckinv_x16  xinv5 ( .A(A), .Q(Z) ) ;
endmodule // xp_ckinvx16 module xp_ckinvx20 ( A , Z ) ;
input A ;
output Z ;
stdcell_ckinv_x16  xinv1 ( .A(A), .Q(float1) ) ;
stdcell_ckinv_x12  xinv2 ( .A(A), .Q(float2) ) ;
```

Fig. 9A

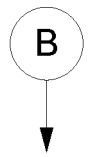

```
endmodule // xp_ckinvx44 module xp_ckinvx48 ( A , Z ) ;
input A ;
output Z ;
stdcell_ckinv_x16   xinv1 ( .A(A), .Q(float1) ) ;
stdcell_ckinv_x12   xinv2 ( .A(A), .Q(Z) ) ;
stdcell_ckinv_x8    xinv3 ( .A(A), .Q(Z) ) ;
stdcell_ckinv_x12   xinv4 ( .A(A), .Q(Z) ) ;
stdcell_ckinv_x16   xinv5 ( .A(A), .Q(Z) ) ;
endmodule // xp_ckinvx48 module xp_ckinvx52 ( A , Z ) ;
input A ;
output Z ;
stdcell_ckinv_x16   xinv1 ( .A(A), .Q(Z) ) ;
stdcell_ckinv_x12   xinv2 ( .A(A), .Q(float2) ) ;
stdcell_ckinv_x8    xinv3 ( .A(A), .Q(Z) ) ;
stdcell_ckinv_x12   xinv4 ( .A(A), .Q(Z) ) ;
stdcell_ckinv_x16   xinv5 ( .A(A), .Q(Z) ) ;
endmodule // xp_ckinvx52 module xp_ckinvx56 ( A , Z ) ;
input A ;
output Z ;
stdcell_ckinv_x16   xinv1 ( .A(A), .Q(Z) ) ;
stdcell_ckinv_x12   xinv2 ( .A(A), .Q(Z) ) ;
stdcell_ckinv_x8    xinv3 ( .A(A), .Q(float3) ) ;
stdcell_ckinv_x12   xinv4 ( .A(A), .Q(Z) ) ;
stdcell_ckinv_x16   xinv5 ( .A(A), .Q(Z) ) ;
endmodule // xp_ckinvx56 module xp_ckinvx64 ( A , Z ) ;
input A ;
output Z ;
stdcell_ckinv_x16   xinv1 ( .A(A), .Q(Z) ) ;
stdcell_ckinv_x12   xinv2 ( .A(A), .Q(Z) ) ;
stdcell_ckinv_x8    xinv3 ( .A(A), .Q(Z) ) ;
stdcell_ckinv_x12   xinv4 ( .A(A), .Q(Z) ) ;
stdcell_ckinv_x16   xinv5 ( .A(A), .Q(Z) ) ;
endmodule // xp_ckinvx64
```

Fig. 9C

```
/* begin Verilog netlist of clock binary clock tree with cross-links */
module clkstationSample ( clk_L5, clk_L4, clk_L3, clk ) ;

input clk_L5;
   output clk_L4;
   output clk_L3;
   output clk;

xp_ckinvx32 xL2_3352p200_2p600 ( .A(clk_L3), .Z(clk) ) ;
xp_ckinvx32 xL2_3405p000_2p600 ( .A(clk_L3), .Z(clk) ) ;
xp_ckinvx32 xL2_3457p800_2p600 ( .A(clk_L3), .Z(clk) ) ;
xp_ckinvx32 xL2_3510p600_2p600 ( .A(clk_L3), .Z(clk) ) ;
xp_ckinvx32 xL2_3563p400_2p600 ( .A(clk_L3), .Z(clk) ) ;
xp_ckinvx32 xL2_3616p200_2p600 ( .A(clk_L3), .Z(clk) ) ;
xp_ckinvx32 xL2_3669p000_2p600 ( .A(clk_L3), .Z(clk) ) ;
xp_ckinvx32 xL2_3721p800_2p600 ( .A(clk_L3), .Z(clk) ) ;
xp_ckinvx32 xL2_3774p600_2p600 ( .A(clk_L3), .Z(clk) ) ;
xp_ckinvx32 xL2_3827p400_2p600 ( .A(clk_L3), .Z(clk) ) ;
xp_ckinvx32 xL2_3880p200_2p600 ( .A(clk_L3), .Z(clk) ) ;
xp_ckinvx32 xL2_3933p000_2p600 ( .A(clk_L3), .Z(clk) ) ;
xp_ckinvx32 xL2_3985p800_2p600 ( .A(clk_L3), .Z(clk) ) ;
xp_ckinvx32 xL2_4038p600_2p600 ( .A(clk_L3), .Z(clk) ) ;
xp_ckinvx32 xL2_4091p400_2p600 ( .A(clk_L3), .Z(clk) ) ;
xp_ckinvx32 xL2_4144p200_2p600 ( .A(clk_L3), .Z(clk) ) ;
xp_ckinvx32 xL2_4197p000_2p600 ( .A(clk_L3), .Z(clk) ) ;
xp_ckinvx32 xL2_4249p800_2p600 ( .A(clk_L3), .Z(clk) ) ;
xp_ckinvx32 xL2_4302p600_2p600 ( .A(clk_L3), .Z(clk) ) ;
xp_ckinvx32 xL2_4355p400_2p600 ( .A(clk_L3), .Z(clk) ) ;
xp_ckinvx32 xL2_4408p200_2p600 ( .A(clk_L3), .Z(clk) ) ;
xp_ckinvx32 xL2_4461p000_2p600 ( .A(clk_L3), .Z(clk) ) ;
xp_ckinvx32 xL2_4513p800_2p600 ( .A(clk_L3), .Z(clk) ) ;
xp_ckinvx32 xL2_4566p600_2p600 ( .A(clk_L3), .Z(clk) ) ;
xp_ckinvx32 xL2_4619p400_2p600 ( .A(clk_L3), .Z(clk) ) ;
xp_ckinvx32 xL2_4672p200_2p600 ( .A(clk_L3), .Z(clk) ) ;
xp_ckinvx32 xL2_4725p000_2p600 ( .A(clk_L3), .Z(clk) ) ;
xp_ckinvx32 xL2_4777p800_2p600 ( .A(clk_L3), .Z(clk) ) ;
xp_ckinvx32 xL2_4830p600_2p600 ( .A(clk_L3), .Z(clk) ) ;
xp_ckinvx32 xL2_4883p400_2p600 ( .A(clk_L3), .Z(clk) ) ;
xp_ckinvx32 xL2_4936p200_2p600 ( .A(clk_L3), .Z(clk) ) ;
xp_ckinvx32 xL2_4989p000_2p600 ( .A(clk_L3), .Z(clk) ) ;
xp_ckinvx32 xL2_5041p800_2p600 ( .A(clk_L3), .Z(clk) ) ;
xp_ckinvx32 xL2_5094p600_2p600 ( .A(clk_L3), .Z(clk) ) ;
xp_ckinvx32 xL2_5147p400_2p600 ( .A(clk_L3), .Z(clk) ) ;
xp_ckinvx32 xL2_5200p200_2p600 ( .A(clk_L3), .Z(clk) ) ;
```

Fig. 10A 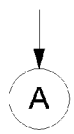

```
xp_ckinvx32 xL2_5253p000_2p600 ( .A(clk_L3), .Z(clk) ) ;
xp_ckinvx32 xL2_5305p800_2p600 ( .A(clk_L3), .Z(clk) ) ;
xp_ckinvx32 xL2_5358p600_2p600 ( .A(clk_L3), .Z(clk) ) ;
xp_ckinvx32 xL2_5411p400_2p600 ( .A(clk_L3), .Z(clk) ) ;
xp_ckinvx32 xL2_5464p200_2p600 ( .A(clk_L3), .Z(clk) ) ;
xp_ckinvx32 xL2_5517p000_2p600 ( .A(clk_L3), .Z(clk) ) ;
xp_ckinvx32 xL2_5569p800_2p600 ( .A(clk_L3), .Z(clk) ) ;
xp_ckinvx32 xL2_5622p600_2p600 ( .A(clk_L3), .Z(clk) ) ;

xp_ckinvx64 xL3_3880p200_8p100 ( .A(clk_L4), .Z(clk_L3) ) ;
xp_ckinvx64 xL3_3933p000_8p100 ( .A(clk_L4), .Z(clk_L3) ) ;
xp_ckinvx64 xL3_5041p800_8p100 ( .A(clk_L4), .Z(clk_L3) ) ;
xp_ckinvx64 xL3_5094p600_8p100 ( .A(clk_L4), .Z(clk_L3) ) ;

xp_ckinvx64 xL4_4461p000_13p600 ( .A(clk_L5), .Z(clk_L4) ) ;
xp_ckinvx64 xL4_4513p800_13p600 ( .A(clk_L5), .Z(clk_L4) ) ;

endmodule // clkstationSample

/* end Verilog netlist of binary clock tree with cross-links*/
```

Fig. 10B

SYSTEM FOR AND METHOD OF PLACING CLOCK STATIONS USING VARIABLE DRIVE-STRENGTH CLOCK DRIVERS BUILT OUT OF A SMALLER SUBSET OF BASE CELLS FOR HYBRID TREE-MESH CLOCK DISTRIBUTION NETWORKS

FIELD OF THE INVENTION

This invention relates to integrated circuits. More particularly, this invention relates to clock distribution networks on semiconductor devices.

BACKGROUND OF THE INVENTION

For a semiconductor device to function properly, it must distribute clock signals to its parallel "sequential elements," such as flip-flops, latches, and memory, at approximately the same time. When clock signals arrive at these parallel elements at different times, the resulting "clock skew" can cause a variety of problems, including setup and hold violations, which can jeopardize the integrity of data transmitted along the device.

Large-scale semiconductor devices reduce skew by using clock distribution networks to distribute clock signals to the elements on the device. To ensure that the rise times and fall times of the clock signals meet design requirements, CMOS inverters or buffers are inserted at regular intervals. (Because inverters and buffers have similar functions in clock distribution networks, these terms are used interchangeably in this application and are also referred to as clock-drivers or clock-driving elements.) The network may diverge at multiple points. This divergence of the clock network and the insertion of CMOS inverters in the clock cause the clock skew to increase. The clock skew can increase for other reasons, such as structural problems, variations in loads along the clock distribution network, variations in process, voltages, or temperature of the inverters, and other effects in the interconnects in the clock distribution network.

One structure used to reduce clock skew is a clock mesh, which introduces interconnect elements, called cross-links, to short outputs of the inverters in the clock distribution network. These cross-links reduce the delay of the clock signals between clock-driving elements, thereby reducing clock skew, though at the expense of short-circuit power. A second structure used to reduce clock skew is a hybrid-tree mesh, such as the hybrid-tree mesh 100 of FIGS. 1A-B. The mesh portion of the hybrid-tree mesh 100, shown in FIG. 1A, includes a spine 110 supporting ribs 120 and 130, inverters 121 on the rib 120, cross-links 121 and 122 coupling clock-driving elements on the ribs 120 and 130, and a non-rectilinear clock mesh region 140. While FIG. 1A shows cross-links between elements along the ribs 120 and 130, in other structures, cross-links are inserted at other locations or combinations of locations in the clock-distribution network, such as within the clock-distribution network, at its end, or both. The mesh portion 100 is in turn driven by a hierarchical binary tree structure 150 shown in FIG. 1B, in which a clock-driving element 145 (level L2) drives 4 clock-driving elements 120A-D (level L1), and a clock-driving element 160 (level L3) drives element 145 and other elements on level L2.

While FIGS. 1A-B show several inverters, ribs, and cross-links to simplify the drawings, clock distribution networks typically have hundreds of thousands of these components directing clock signals to thousands of clock-receiving (sequential) elements. These elements represent different loads to the clock-distribution network, resulting in higher skew, as do other structures such as the non-rectilinear component 140 in FIG. 1A.

In order to reduce short-circuit power, it is important to keep the skew between the inputs of inverters whose outputs are shorted as low as possible. Thus, it is important to reduce the structural skew of the clock distribution network at design time. It may not be possible to guarantee that inverters of a clock distribution network whose outputs are shorted with a cross-link have the same load characteristics. Hence, a tune-able clock inverter is required to reduce the structural skew. The clock inverters are tuned so that those that drive large loads have large drive strengths and those that drive smaller loads have smaller driver strengths. In the last stage of a hybrid tree-mesh clock distribution network, the loads can vary substantially due to various reasons including variation in flip-flop density and non-rectilinear clock mesh regions. A tune-able clock inverter may be constructed by combining multiple base cells and connecting/disconnecting their outputs to form different effective drive strengths. This way, the input capacitance stays the same and only the output drive strength changes, thus making tuning of the clock network easier and more predictable. One way to make a tune-able clock inverter is to combine them to make one macrocell and then use that macrocell where required. One drawback to this approach is that this macrocell is treated by Electronic Design Automation (EDA) tools as a single cell through all levels of the physical design. This may require an accurate transistor level extraction and characterization of the macrocell. Also, in order to maintain the macrocell as a single cell, timing DBs, physical cell views, LVS netlists, and other collateral for this cell must be generated.

BRIEF SUMMARY OF THE INVENTION

In a first aspect of the invention, a method of placing macrocells of a semiconductor device according to an integrated circuit design. The process includes generating a collection of macrocells instantiated in the integrated circuit design, wherein instance names of the macrocells include placement information for placing the macrocells in a layout of the integrated circuit design, and further wherein each of the macrocells includes one or more corresponding base cells, extracting from each of the instance names of the macrocells the corresponding placement information, and placing the macrocells based on the placement information. Each of the macrocells is placed by placing its base cells at fixed locations relative to each other based on the corresponding placement information. In one embodiment, the placement information includes (X,Y) coordinates, and the fixed locations are fixed locations from the (X,Y) coordinates. In different embodiments, the fixed locations are in a same row of a layout of the integrated circuit design, the fixed locations are in different rows of a layout of the integrated circuit design, or the fixed locations in both a same and different rows of a layout of the integrated circuit design.

In one embodiment, the macrocells form clock stations on a clock-distribution network, such as a hybrid tree-mesh clock-distribution network. In one embodiment, the placement information also includes a level number corresponding to a level of a macrocell in a clock station of the clock-distribution network. As some examples, the base cells comprise inverters, buffers, integrated clock-driving cells, complex logic functions, or any combination thereof.

In another embodiment, the method also includes determining target drive strengths of clock signals for multiple sequential components on the semiconductor device, determining combinations of standard-size clock-driving elements, wherein each of the standard-size clock-driving elements corresponds to one of the base cells, each of the groups having a group drive strength equal to a sum of the drive strengths of the clock-driving elements in the group, each of the group drive strengths substantially equal to one of the target drive strengths, and combining the clock-driving elements into the groups. In one embodiment, drive strengths of the standard-size clock-driving elements include 8×, 12×, and 16×, and drive strengths of the groups range from 0× to 64×.

In a second aspect of the invention, a method of routing inputs or outputs of base cells of a macrocell forming a semiconductor device according to an integrated circuit design. The process includes generating a macrocell instantiated in an integrated circuit design, wherein the macrocell contains multiple base cells, placing the base cells in a pre-determined arrangement relative to each other in a layout of the integrated circuit design, and routing the base cells. In one embodiment, the process also includes extracting from an instance name of the macrocell placement information for placing the macrocell in the layout. As different examples, the pre-determined arrangement is placement in a single column of the layout, placement in a single row of the layout, or both. In one embodiment, the placement information includes an (X,Y) coordinate.

In different embodiments, the process also includes determining locations of pins of the base cells, wherein the pins of the base cells comprise input pins, output pins, or both, calculating locations of the pins for instances of the base cells to calculate offsets for the pins relative to the (X,Y) coordinate, generating physical routes to couple all the input pins of the base cell to one another, to couple all the output pins of the base cells to one another, or both. In one embodiment, the process also includes marking one or more locations on the layout with terminals. In another embodiment, the process also includes coupling all the input pins to one of the terminals, coupling all the output pins to another of the terminals, or both. In yet another embodiment, the process also includes coupling inputs and outputs of multiple macrocells according to connectivity in a netlist corresponding to the semiconductor device, and balancing lengths of the routes to maintain skew of the semiconductor device within a pre-determined range.

In a third aspect of the invention, a system places base cells of a macrocell corresponding to an integrated circuit design composed of multiple macrocells. The includes a processor and logic configured to extract placement information from an instance name of the macrocell and to place the base cells in pre-determined relative arrangement based on the placement information.

In a fourth aspect of the invention, a semiconductor device with a clock-distribution network thereon includes clock-driving elements formed from macrocells comprising only standard-size base cells, wherein, for each of the macrocells, the corresponding base cells are arranged according to a pre-determined arrangement relative to the macrocell. In one embodiment, for each of the macrocells, the corresponding base cells are placed in a single column on different rows of semiconductor device. As only some examples, the clock-distribution network includes a clock tree, a clock mesh, or a hybrid tree-mesh.

BRIEF DESCRIPTION OF THE SEVERAL VIEWS OF THE DRAWINGS

The following figures are used to illustrate embodiments of the invention. In all the figures, the same label refers to the identical or a similar element.

FIGS. 9A-C and 10A-B are Verilog netlists illustrating how tune-able clock inverters are constructed in accordance with one embodiment of the invention.

DETAILED DESCRIPTION OF THE INVENTION

Figure 1A:
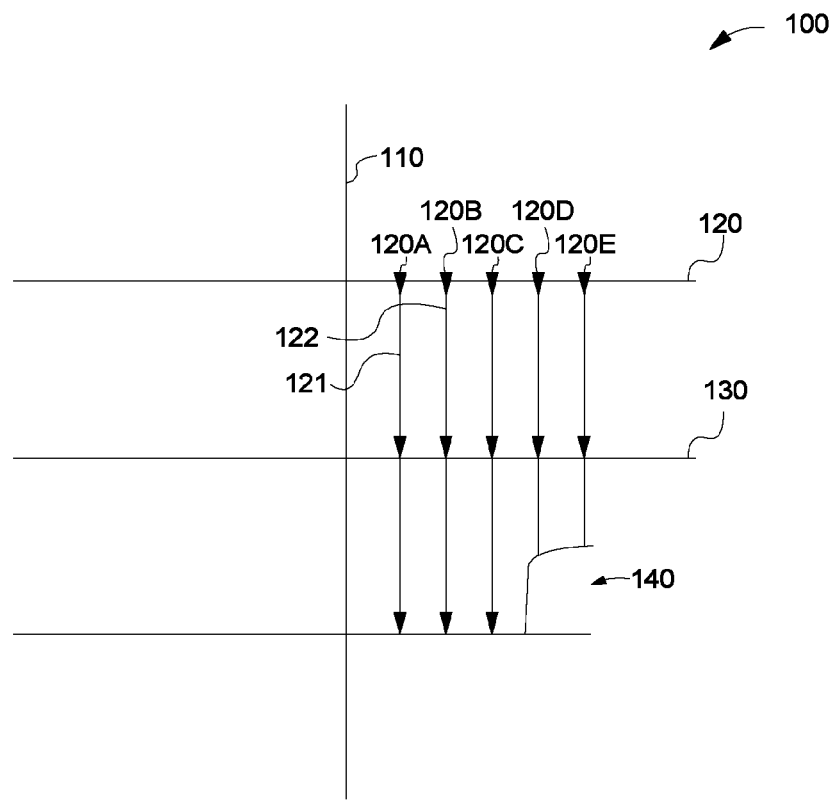
FIGS. 1A-B are high-level diagrams of portions of a prior art mesh-tree hybrid clock distribution network.

In accordance with the principles of the invention, a soft-macrocell of a tune-able clock driver is generated at the RTL stage of an electronic design automation (EDA) process. All tools in the EDA process flow break the cell into its component base cells, thus eliminating the need to maintain timing DBs, physical cell views, LVS netlists, and other collateral for the macrocell.

In accordance with the invention, a soft-macro of the tune-able clock drivers is generated, but the macrocell is not maintained through the flow. A soft-macro is generated at the RTL stage and tools used in the flow to break up the cell into its component base cells, thus eliminating the need to maintain timing DBs, physical cell views, LVS netlists and other collateral for the macrocell.

The following description first explains how macrocells from a standard cell library are combined to generate a tune-able range of drive strength signals for driving clock-receiving elements in a clock distribution network. Next, the description explains how those macrocells are placed and routed.

Generating Clock-Distribution Network Using Only Standard-Sized Macrocells

In accordance with the principles of the invention, a semiconductor-device clock-distribution network uses only standard sized inverters, regardless of the drive strengths needed to drive sequential (clock-receiving) elements on the device. Because custom-sized inverters do not have to be fabricated or purchased from third parties, the design process is less expensive than prior art processes. Furthermore, because these standard-sized inverters have been more thoroughly tested and function more predictably, the time for debugging semiconductor devices using these clock distribution networks is reduced, allowing products to be brought to market more quickly.

As one example, during the electronic design automation, a drive strength for a clock-receiving component is determined. The system determines a combination of the custom-sized CMOS inverters, such that their combined drive strength is large enough to drive the sequential element yet small enough to minimize short-circuit power. The combination of custom-sized components is then simulated and, later, the corresponding inverters are placed and routed to form the physical semiconductor device. The resulting clock inverter drives the various loads on a single semiconductor device while maintaining low skew and has a range of drive strengths and enough granularity to maintain a low skew.

In one embodiment, the standard sized inverters (or other "clock-driving" elements) have drive strengths of 0x, 8x, 12x, and 16x. These inverters are able to be combined to form tuneable inverters of drive strengths 0x, 8x, 12x, 16x, 20x (8x+12x), 24x(12x+12x), 28x (20x+8x), 32x (16x+16x), 36x (8x+12x+16x), 40x (8x+16x+16x), 44x (12x+16x+16x), 48x (16x+16x+16x), 52x (8x+12x+16x+16x), 56x (8x+16x+16x+16x), and 64x (16x+16x+16x+16x). It will be appreciated that other inverter drive strengths are able to be combined to form these values, for example, a 24x drive strength is able to be formed by 3 inverters with 8x drive strengths. Preferably, the drive strength is determined by combining the fewest numbers of inverters. In other words, in one example, a drive strength of D is determined by combining inverters according to the formula:

$$Dx = 8x*a + 12x*b + 16x*c \quad (1)$$

where a+b+c (the total number of inverters) is minimized. In accordance with the principles of the invention, using other design constraints, other selection criteria are able to be used.

By combining inverters into various groups, a distributed clock network is able to generate "ganged" inverters having a pre-determined range of values. In this example, clock inverters are able to have any value in the range 0x (e.g., where a dummy load is needed merely for symmetry) to 64x, with the values 0x, 8x, 12x, 16x to 56x, in 4x increments, and 64x. It will be appreciated that using different standard-sized inverters, other ranges of signal strengths in other increments are able to be produced.

Figure 2:
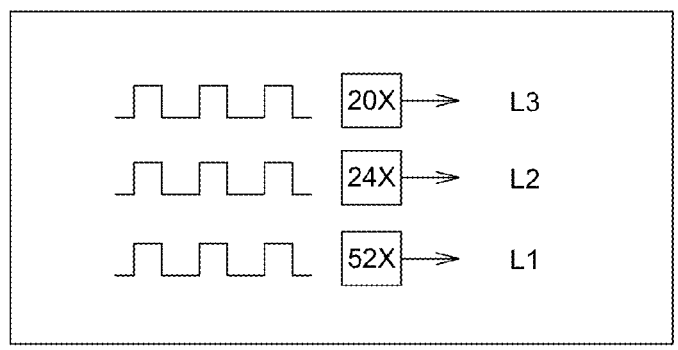
FIG. 2 schematically shows a portion of a clock distribution network driving sequential elements that present different loads to the network.
Figure 3A:
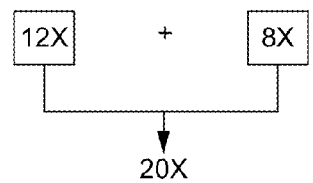
FIGS. 3A-D are diagrams used to illustrate how standard-size cells are combined to tune a clock-distribution network in accordance with the principles of the invention.
Figure 3B:
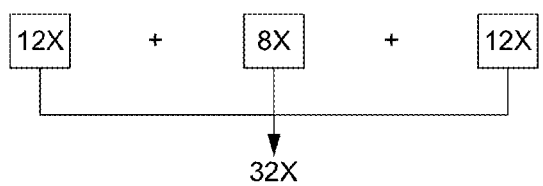
Figure 3C:
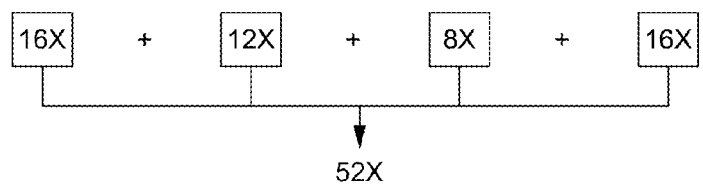
Figure 3D:
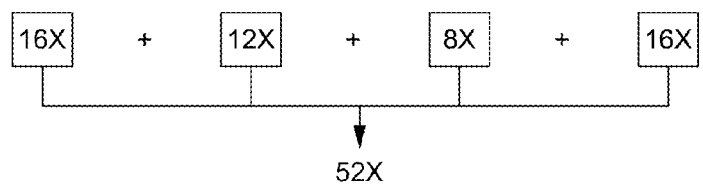

FIG. 2 schematically illustrates a portion of a distributed clock network 200 driving 3 different loads, L1, L2, and L3. The clock network 200 is able to form part of any semiconductor device, such as a microprocessor. During the synthesis of the semiconductor device 200, the load values L1, L2, and L3 are determined. In this example, the values L1, L2, and L3 are different from each other because of variations in flip-flop density and non-rectilinear clock meshes. Those skilled in the art will recognize that the loads are able to vary for other reasons.

The load L3 requires a clock signal with a 20x drive strength, the load L2 requires a clock signal with a 24x drive strength, and the load L1 requires a clock signal with a 52x drive strength. The inverters of the clock distribution network are fabricated using only standard-sized cells, of drive strength values 8x, 12x, and 16x. The clock signal with the 20x drive strength is fabricated by combining or "ganging" two standard-size inverters with drive strengths of 8x and 12x, respectively. The clock signal with the 24x drive strength is fabricated by combining two standard-size inverters with drive strengths of 8x and 16x, respectively. The clock signal with the 52x drive strength is fabricated by combining four standard-sized inverters with drive strengths of 16x, 16x, 12x, and 8x, respectively. In this example, the synthesis step is followed by simulation, timing analysis, placement and routing, extraction, and verification steps.

FIGS. 3A-D illustrate how a standard cell library of only 3 cells, with drive strengths of 8x, 12x, and 16x (FIG. 3A) are able to be combined to produce cells with drive strengths of 20x (FIG. 3B), 32x (FIG. 3C), and 52x (FIG. 3D), to give only a few examples of the possible combinations.

Figure 1B:
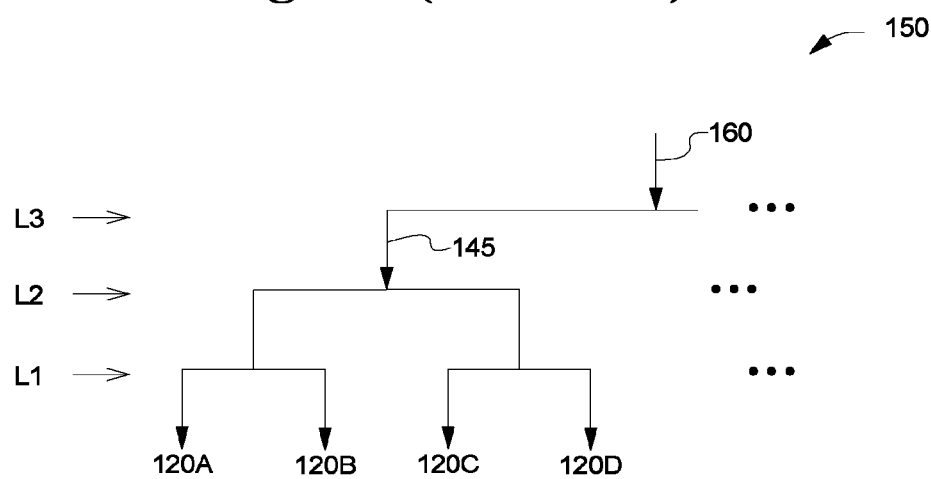

In one embodiment, the standard-size inverters are all fabricated on one or more layers of a semiconductor device. The inverters are combined or "tuned" by VIA programming, that is, by adding or removing vias that electrically couple the inverters together and to an output pin that drives the sequential elements. Referring to FIG. 1B, tuning in this way does not affect the upstream elements (e.g., 145 and 160) in the clock distribution network.

In one embodiment, the base cells are combined to produce a tune-able clock inverter using "VIA34 programming." The base cells are placed on adjacent rows of the semiconductor device, one on top of another, and drawing in the metal layer 4 (M4) of the semiconductor device straps connected to the output net. The M4 straps are, in turn, able to be connected through higher metal layers. Thus, the base cell's output is able to be connected to or disconnected from the output net by respectively inserting or removing a via from the metal 3 layer (M3) to M4. All other metal layers and vias are left untouched. Thus, the drive strength of the clock inverters is able to be tuned merely by adding or removing a via (VIA34) between two layers (M3 and M4).

Figure 4:
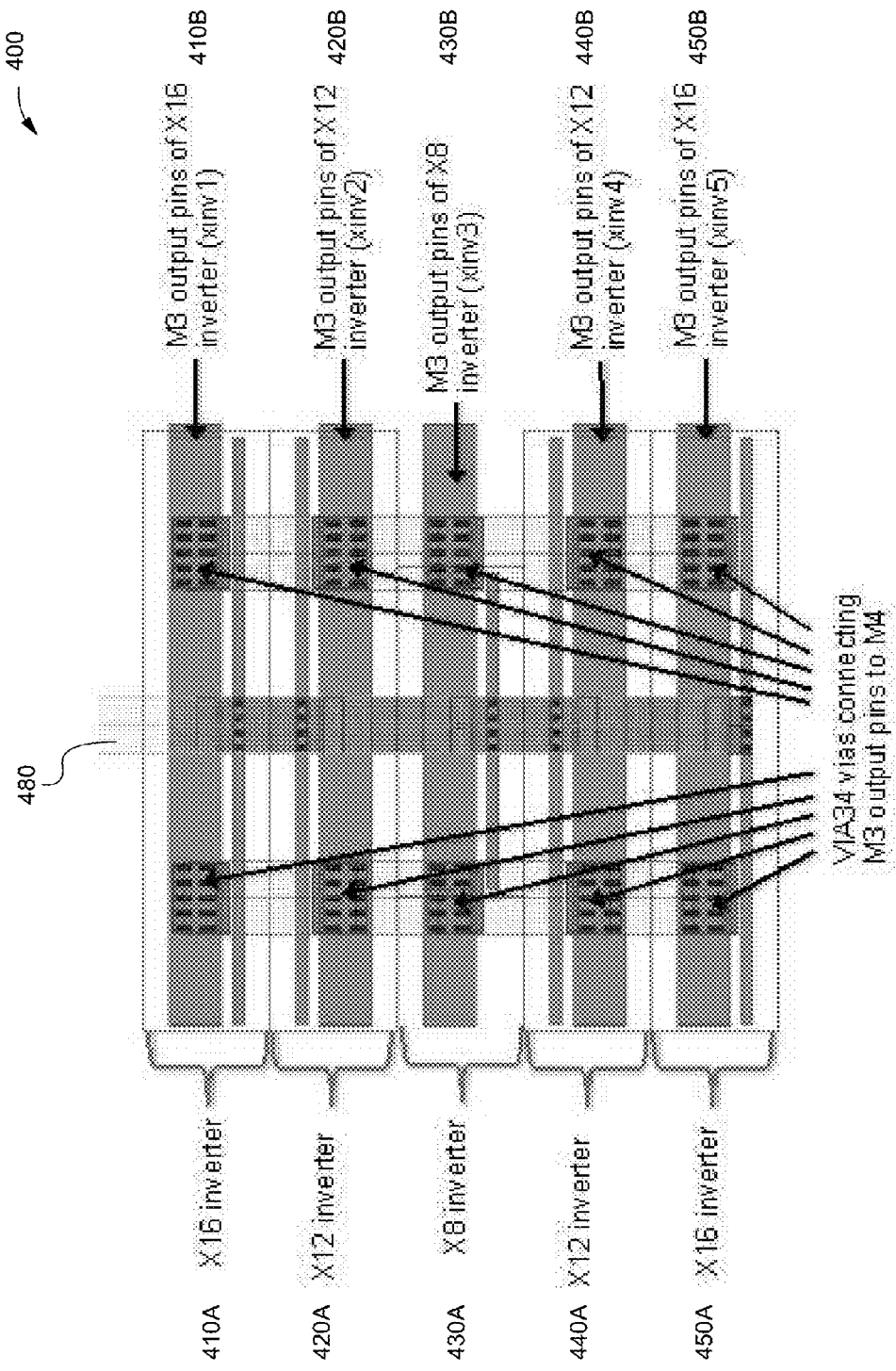
FIGS. 4-6 are semiconductor device layouts showing programming of 64×, 32×, and 0× strength clock inverters, respectively, in accordance with embodiments of the invention.
Figure 5:
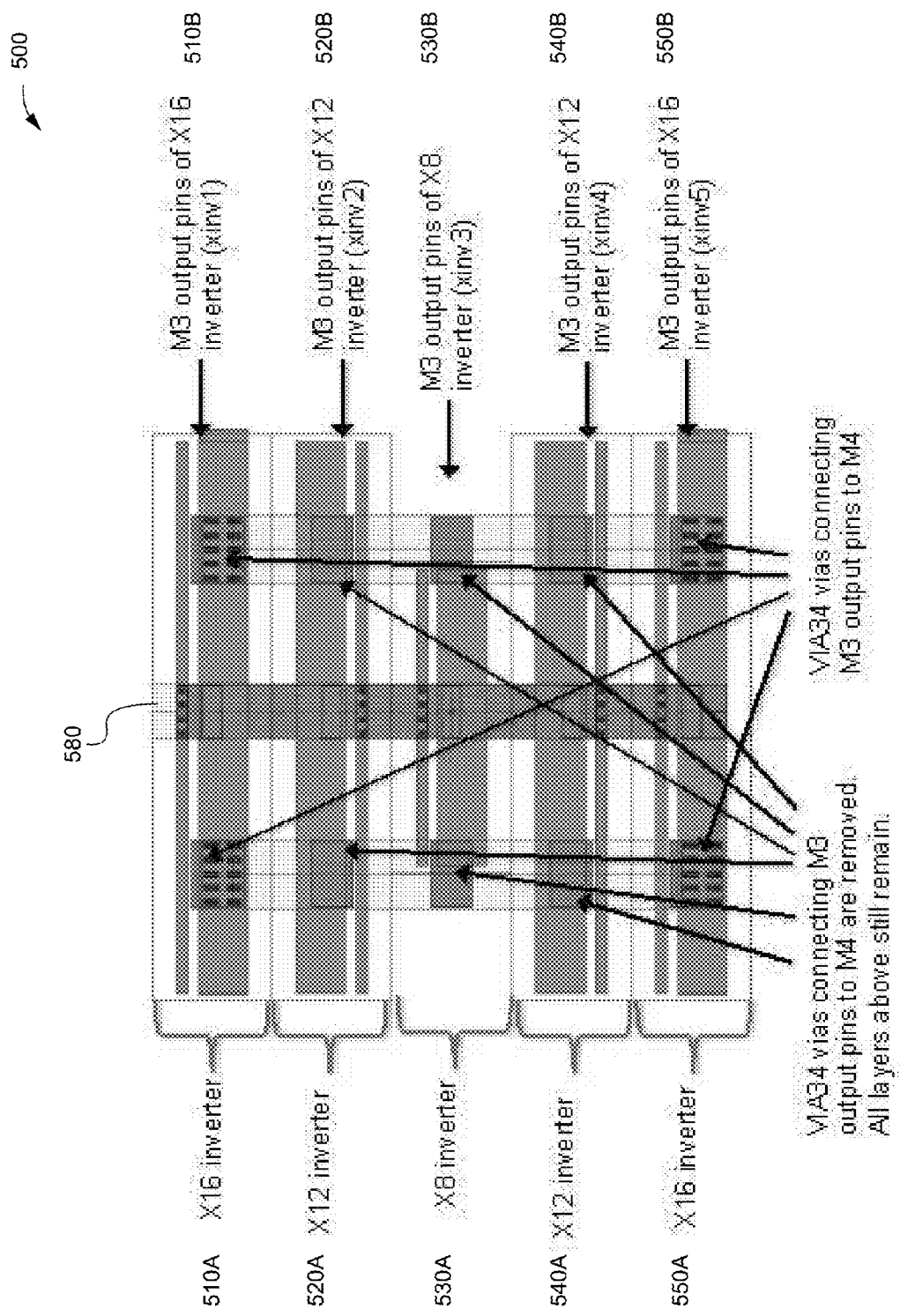
Figure 6:
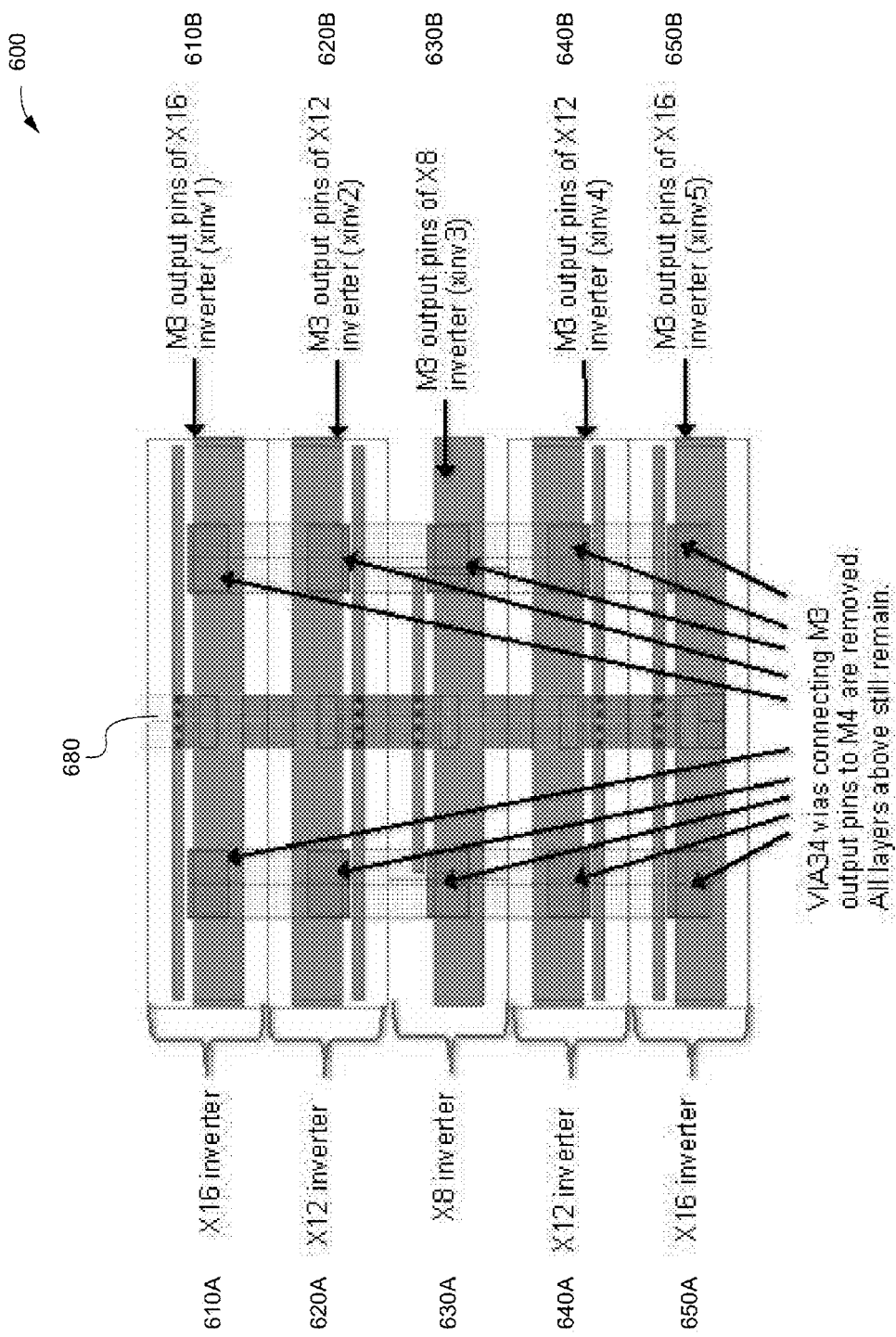

FIGS. 4-6 are layouts showing VIA34 programming of 64x, 32x, and 0x drive strength clock inverters, respectively, using the same (base) standard-size clock cells in M4 and output pins for each of the cells in M3. Each of the layouts shows a left-hand side that contains 16x, 12x, 8x, 12x, and 16x inverters in M4, a right-hand side that contains output pins of the respective inverters in M3, and vias between M3 and M4 for electrically coupling the inverters on the left-hand side to their respective output pins FIG. 4, for example, is a layout 400 with vias 480 programmed to connect all the M3 output pins (410B, 420B, 430B, 440B, 450B) to all the 16x, 12x, 8x, 12x, and 16x inverters (410A, 420A, 430A, 440A, 450A), thereby producing a clock signal on the output pins with a combined drive strength of 16x+12x+8x+12x+16x, or 64x. FIG. 5 is a layout 500 having output pins (510B, 520B, 530B, 540B, 550B) and inverters (510A, 520A, 530A, 540A, 550A), with vias 580 programmed to connect two M3 output pins (510B and 550B) to the outputs of the two corresponding 16x inverters (510A and 550A), thereby producing a clock signal with a combined drive strength of 16x+16x, or 32x. FIG. 6 is a layout 600 having output pins (610B, 620B, 630B, 640B, 650B) and inverters (610A, 620A, 630A, 640A, 650A), with vias 680 connecting the M3 output pins to the 16x, 12x, 8x, 12x, and 16x inverters removed, thereby producing a OX (dummy) drive strength clock inverter. Those skilled in the art will recognize other VIA34 programming for combining clock elements to produce clock signals with other clock strengths.

Figure 7:
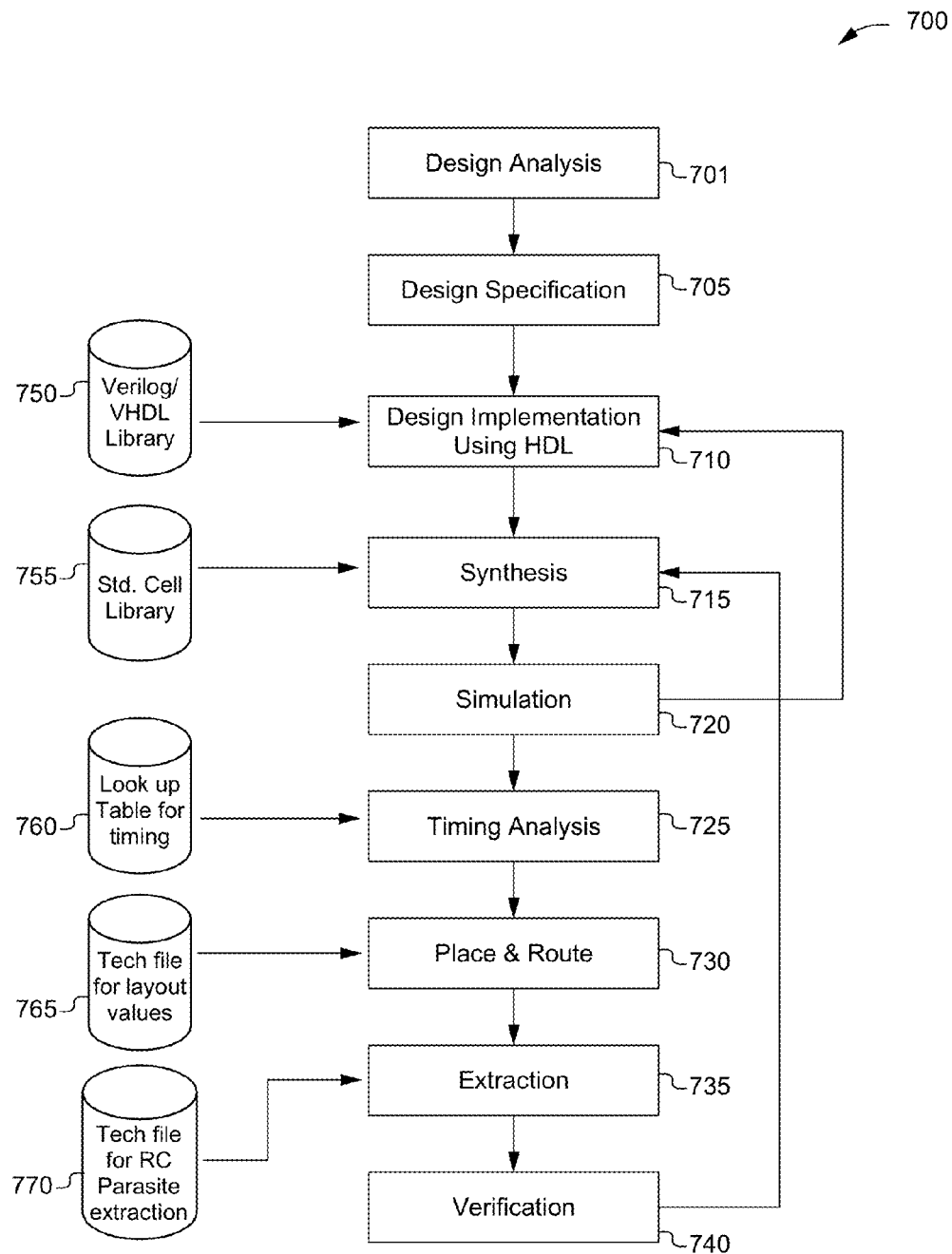
FIG. 7 is a flow chart of the steps of a digital design flow, including combining clock-driving elements in a clock-distribution network in accordance with one embodiment of the invention.

FIG. 7 illustrates a flow chart of the steps 700 of a digital design flow for a semiconductor device with corresponding hardware components, used in accordance with embodiments of the invention. The design analysis, design specification, and design implementation using a hardware-description language and a Verilog/VHDL library 750, occurs in the steps 701, 705, and 710, respectively. The synthesis step occurs in the step 715, using a standard cell library 755. In this step, which can include a number of sub-steps, building blocks of the components, including the clock distribution network and sequential components, are synthesized. The clock-distribution network is synthesized using only standard-size cells. At this stage, the logic circuits are determined. The output of the synthesis step 715 is a netlist, an ASCII file that indicates the devices and interconnections between them. The simulation occurs in the step 720, using the netlist to verify the design and, if not to specification, the process loops back to the step 710. Otherwise, the process continues to the timing analysis in the step 725 where, for example, skew is determined. The step 725 is followed by placement and routing in the step 730, extraction in the step 735, in which components that affect performance are extracted and examined, and the verification step 740, in which the device is fabricated or the design is reworked for optimization or modification. If the design must be modified, the process loops back to the step 720.

As shown in FIG. 7, the timing analysis step 725 accesses a Look-up Table for Timing 760, the placement-and-routing step 730 accesses a Tech file for layout values 765, and the extraction step 735 accesses a Tech File for RC parasitic extraction 770.

It will be appreciated that the steps 700 are merely illustrative of one embodiment of the invention. In other embodiments, other steps are added, some steps are combined, and the sequence of steps are performed in different orders, to name only a few modifications.

Figure 8:
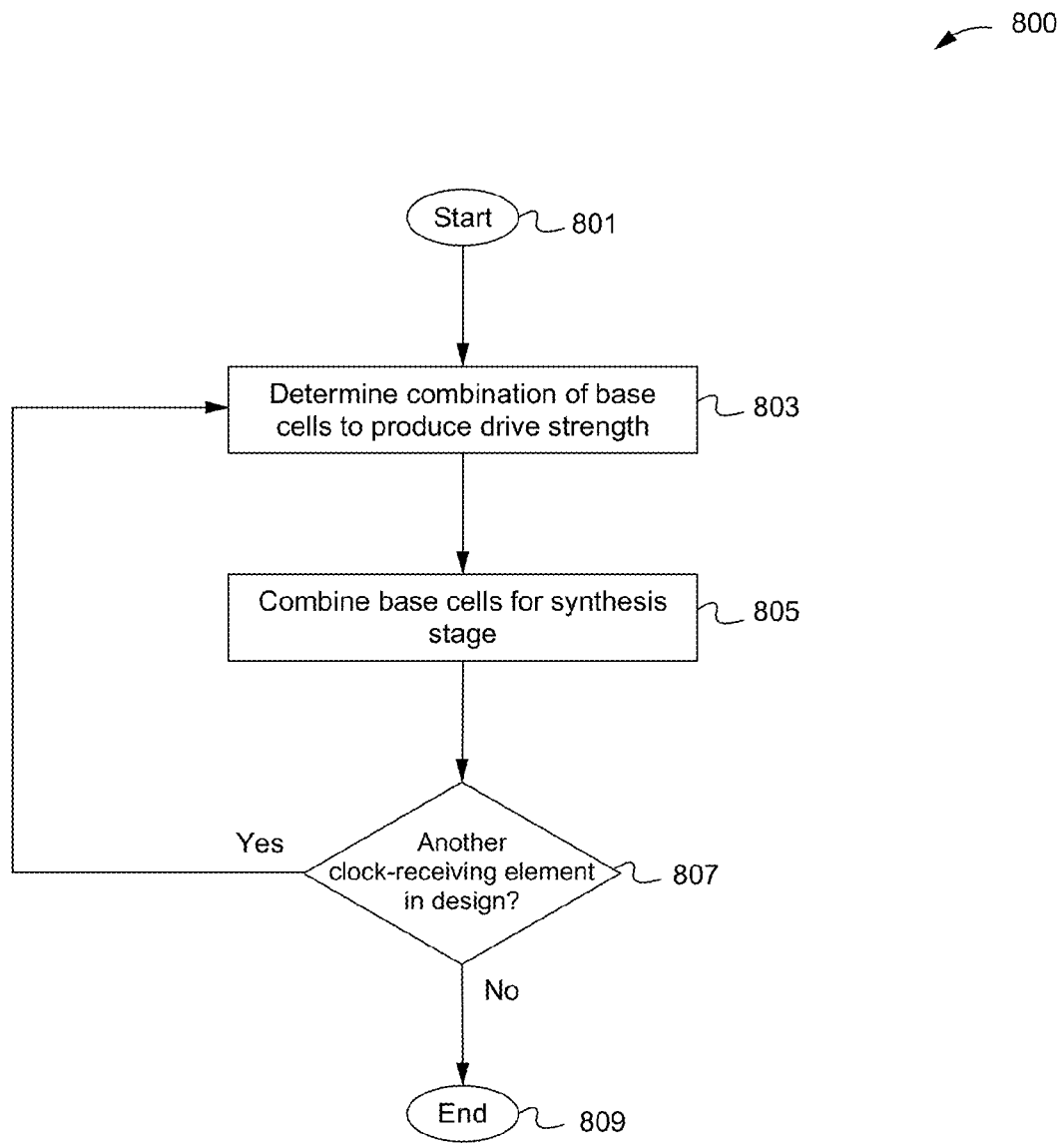
FIG. 8 is a flowchart of the steps of a process for combining standard-size clock-driving elements in accordance with one embodiment of the invention.

FIG. 8 shows the steps 800 for determining the standard-cell inverters stored in the standard cell library 755 in FIG. 7. At this stage in the process, the loads on each clock inverter (and thus the required or "target" drive strengths) have been determined, such as in the synthesis step 715, the verification step 740, or some other step. In the start step 801, a first clock-receiving element driven by a target drive strength is selected. In the step 803, combinations of standard-size macrocells stored in the standard cell library are determined to produce the appropriate clock drive strength signal, such as shown in Equation 1 above. In the step 805, these inverters are then combined or "ganged" to produce the target drive strengths using VIA programming, such as shown in FIGS. 4-6. In the step 807, the process determines whether there is another clock-receiving element in the design and, if so, loops back to the step 803; otherwise, the process ends in the step 809.

It will be appreciated that the steps 800 are merely illustrative of one embodiment of the invention. In other embodiments, other steps are added, some steps are combined, and the sequence of steps are performed in different orders, to name only a few modifications.

Figure 9B:

FIGS. 9A-C together illustrate a Verilog netlist 900 showing how a tune-able clock inverter is constructed in accordance with one embodiment of the invention. The netlist 900 illustrates the construction of binary tree with clock inverters with cross-links shorting the outputs of the clock inverters. The macrocells in this example are of drive strengths 0×, 8×, 12×, 16×, 20×, 24×, 28×, 32×, 36×, 40×, 44×, 48×, 52×, 56× and 64× using only the 8×, 12× and 16× drive strength clock inverter cells from a standard cell library. They are connected to form a clock station. A mesh clock distribution network consists of one or more of these clock stations together driving a clock mesh. In this example, the tune-able clock inverters are xp_ckinvx0, xp_ckinvx8, xp_ckinvx12, xp_ckinvx16, xp_ckinvx20, xp_ckinvx24, xp_ckinvx28, xp_ckinvx32, xp_ckinvx36, xp_ckinvx40, xp_ckinvx44, xp_ckinvx48, xp_ckinvx52, xp_ckinvx56, and xp_ckinvx64, which represent, respectively, the 0×, 8×, 12×, 16×, 24×, 28×, 32×, 36×, 40×, 44×, 48×, 52×, 56×, and 64× drive strengths. The base standard cells used to construct the tune-able clock inverters are two stdcell_ckinv_x16 cells, two stdcell_ckinv_x12 cells, and one stdcell_ckinv_x8 cell. The stdcell_ckinv_x16, stdcell_ckinv_x12, and stdcell_ckinv_x8 cells represent, respectively, the 16×, 12×, and 8× drive strength clock inverters from the standard cell library. The input net is "A" and the output net is "Z."

While the examples above show construction of tune-able inverters, the invention is able to be extended to other cells as well including buffers or any other logic gate. Tune-able buffers or clock-driving elements are also able to be constructed by combining a small set of base standard-cells and making their output connections programmable through only via changes.

Placing and Routing of the Standard-Sized Macrocells

FIGS. 10A and 10B together illustrate a Verilog netlist 1000 of a binary clock tree with cross-links, used to illustrate how instance names are embedded with placement information, in accordance with one embodiment of the invention. The module "clkstationSample" is the clock station consisting of clock drivers using one of the tune-able clock inverters. The module "clkstationSample" has one input "clk_L5" and one output "clk". Output ports clk_L4, clk_L3 are also able to be added for the intermediate nodes of the clock distribution. The addition of these ports to the netlist help with tuning at every stage of the clock station. Also, the instance names of each clock inverter instantiated in the clock station have in them the level of the driver in the clock station and also physical X- and Y-coordinates of the placement of the driver. In this example, all instance names starting with xL2 signify the last (leaf) stage of the clock station. The xL2 drivers are driven by xL3 drivers which are in turn driven by xL4 drivers. The X-coordinate and the Y-coordinate are in the instance name following the level number of the driver. For example, the instance $xp\_ckinvx64xL3\_5094p600\_8p100(.A(clk\_L4), Z(clk\_L3));$ describes a 64× drive strength driver at level 3 at X coordinate 5094.6 and Y coordinate 8.1 with input net clk_L4 and output net clk_L3. The instance name (with level and physical co-ordinate information) plays a role in the layout and in the tuning flow, described below.

For layout of the clock station, the netlist is read into the PnR (Place-and-Route) tool and the physical coordinate information that is part of the cell is used to guide the placement. For example, the cell xL3_5094p600_8p100 is an instance of the macro-cell xp_ckinvx64 which consists of 5 cells xinv1, xinv2, xinv3, xinv4, xinv5. When the netlist is read into the PnR tool, the PnR tool will recognize the following five cells xL3_5094p600_8p100/xinv1
xL3_5094p600_8p100/xinv2
xL3_5094p600_8p100/xinv3 xL3_5094p600_8p100/xinv4
xL3_5094p600_8p100/xinv5 instead of recognizing them as part of one physical cell. In order to place these five cells together, the placement information is embedded in the name of the instance to first place the cell xL3_5094p600_8p100/xinv5 centered at or some offset from the (X, Y) coordinate 5094.6, 8.1. Next, cell xL3_5094p600_8p100/xinv4 is placed one standard-cell row (or some integer multiple of a standard-cell row) above xL3_5094p600_8p100/xinv5. This is followed by xL3_5094p600_8p100/xinv3, xL3_5094p600_8p100/xinv2, xL3_5094p600_8p100/xinv1 all being placed on top of each other. Alternatively, the cells are able to be placed next to each other on the same row or keeping some cells in one row and other cells in another row. Any arrangement of cells is allowed as long as the cells do not overlap and the relative positioning of the base cells within each macrocell remains the same. This is required to make the routing of the macrocell deterministic. The relative placement of each of the base cells within the macrocell ensures that the input and output pin locations of the base cells are known.

Figure 11:
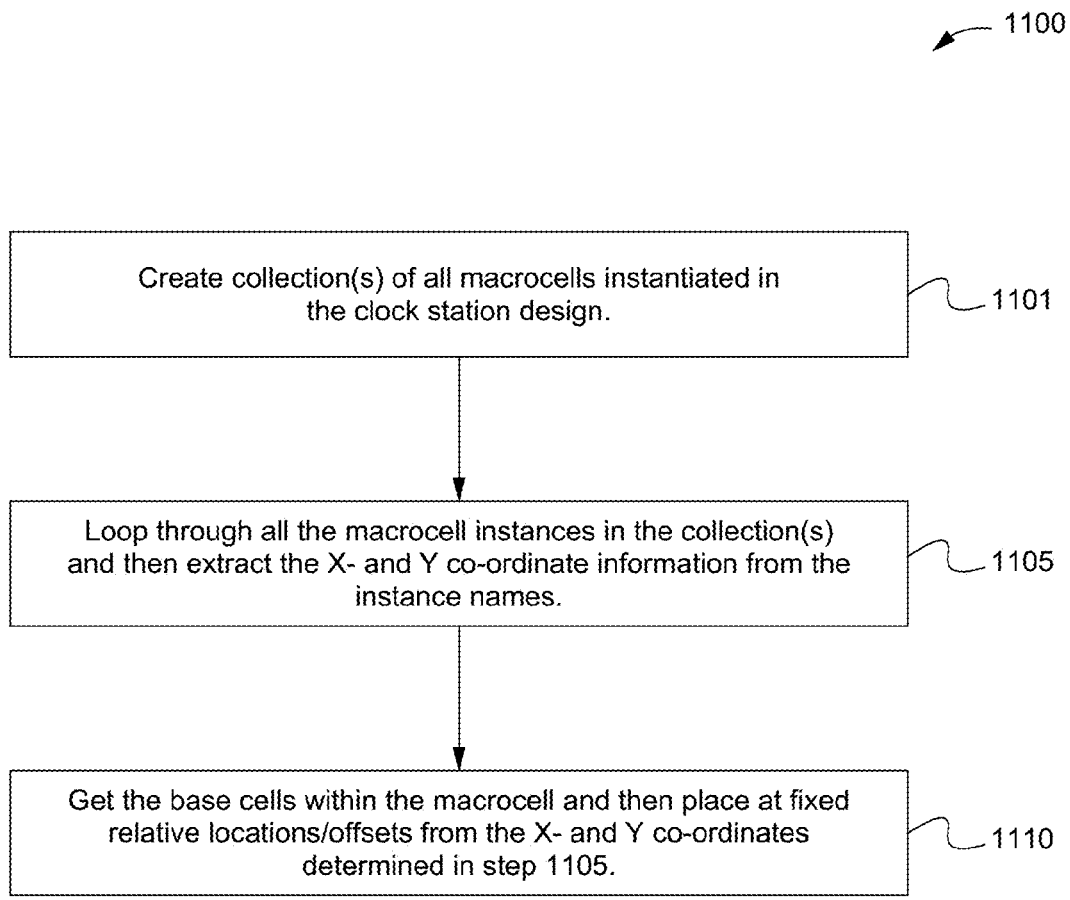
FIG. 11 is a flow chart of the steps for placing cells in a semiconductor layout in accordance with one embodiment of the invention.

FIG. 11 shows the steps 1100 of a process for placing all the base cells within a macrocell in accordance with one embodiment of the invention. In the step 1101, a collection of all the macrocells instantiated in the clock station design is created. Next, in the step 1105, the process loops through all the macrocell instances in the collection(s) and then extracts the (X,Y) coordinate information from the instance name. Next, in the step 1110, the base cells within the macrocell are retrieved and placed at a fixed relative locations/offsets from the (X,Y) coordinates determined in the step 1105.

Once all the cells are placed, they are uniquified and linked to the physical DB. In the IC Compiler PnR tool from Synopsys this is accomplished with the following commands:

uniquify_fp_mw_cel
link
link_physical_library

The routing of the inputs and outputs of the cells are also guided with help of the instance name and the Verilog netlist. This routing uses placement information and then connects the cells together. This is possible only because the placement of each of the base cells within the macrocells is at a known offset from the (X, Y) coordinates embedded in the instance name of the cell.

Figure 12:
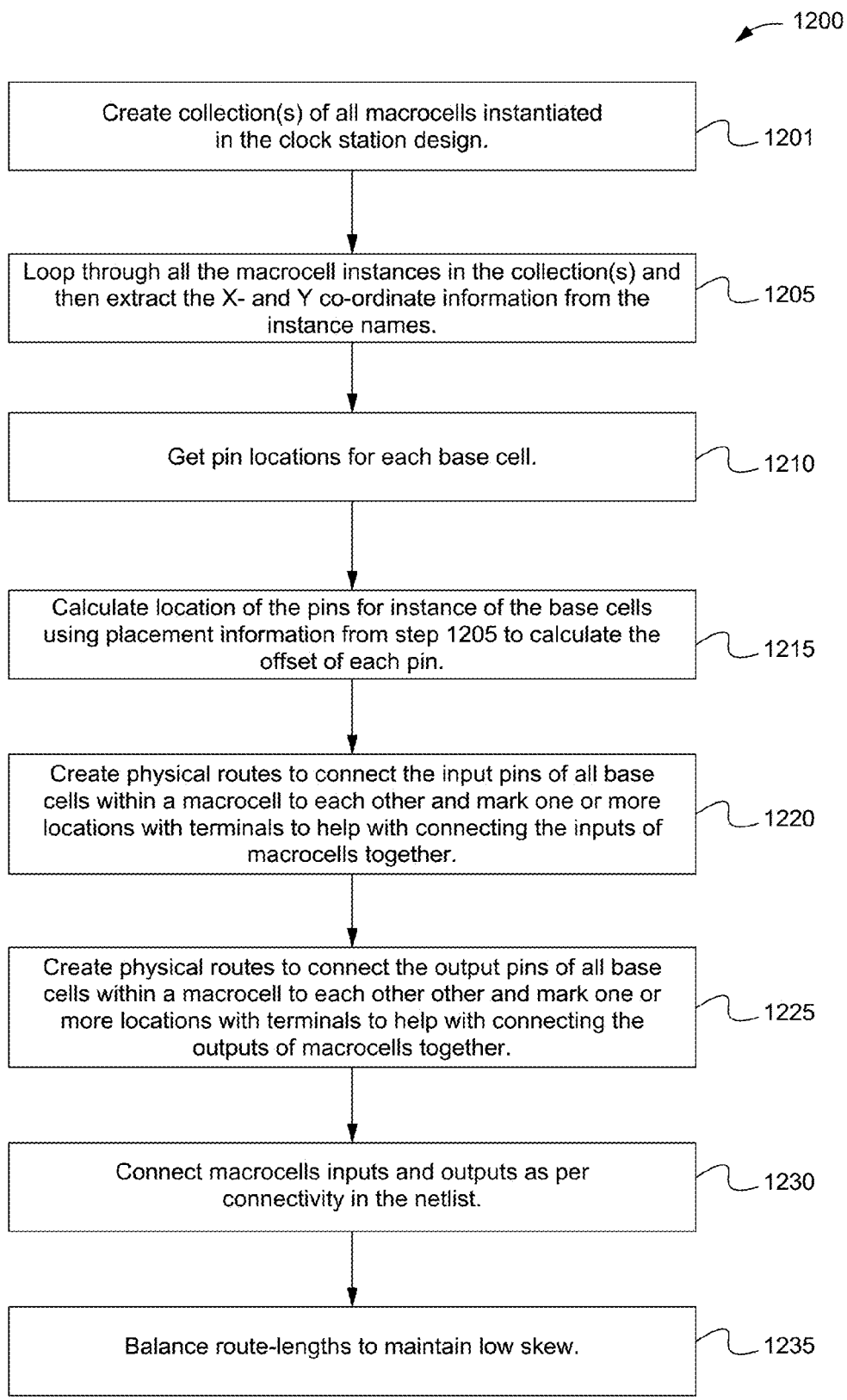
FIG. 12 is a flow chart of the steps for routing interconnections between cells in accordance with one embodiment of the invention.

FIG. 12 shows the steps 1200 of a process for routing in accordance with one embodiment of the invention. In the step 1201, a collection(s) of all macro-cells instantiated in the clock station design is created. Next, in the step 1205, the process loops through all the macrocell instances in the collection(s) and then extracts the (X,Y) coordinate information from the instance name. Next, in the step 1210, the pin locations for each base cell are retrieved. Next, in the step 1215, locations of the pins for instance of the base cells using placement information from the step 1205 are calculated to calculate the offset of each pin. Next, in the step 1220, physical routes are created to connect the input pins of all the base cells within a macrocell to each other and to mark one or more locations with terminals to help with connecting the inputs of macrocells together. Next, in the step 1225, physical routes are created to connect the output pins of all base cells within a macrocell to each other and mark one or more locations with terminals to help with connecting the outputs of macrocells together. Next, in the step 1230, macrocells inputs and outputs are connected as per connectivity in the netlist. Finally, in the step 1235, route lengths are balanced to maintain low skew.

In one embodiment, the steps 1100 and 1200 are performed during the step 730 of FIG. 7.

Figure 13:
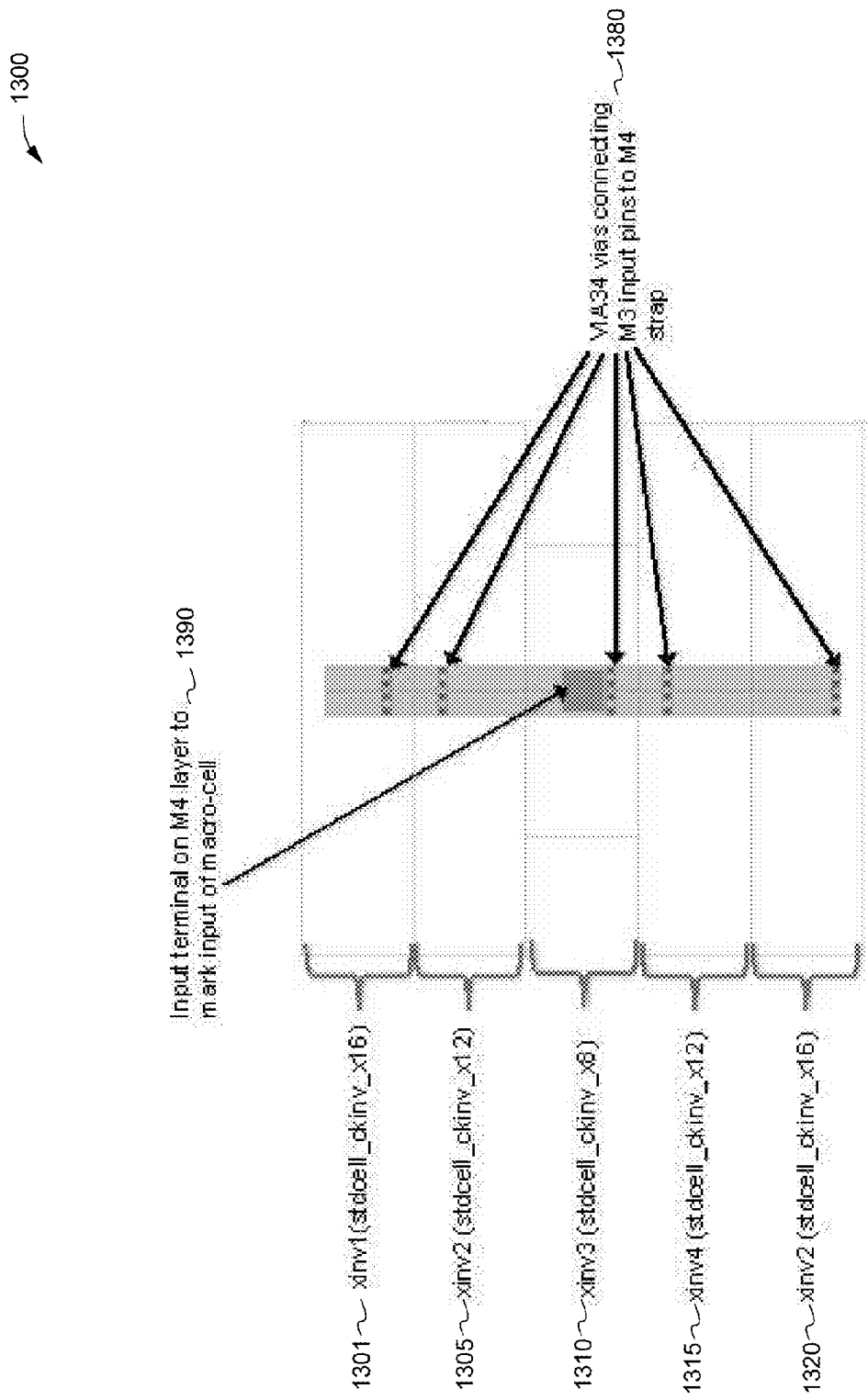
FIG. 13 is a schematic illustrating input routing for a macrocell in accordance with one embodiment of the invention.
Figure 14:
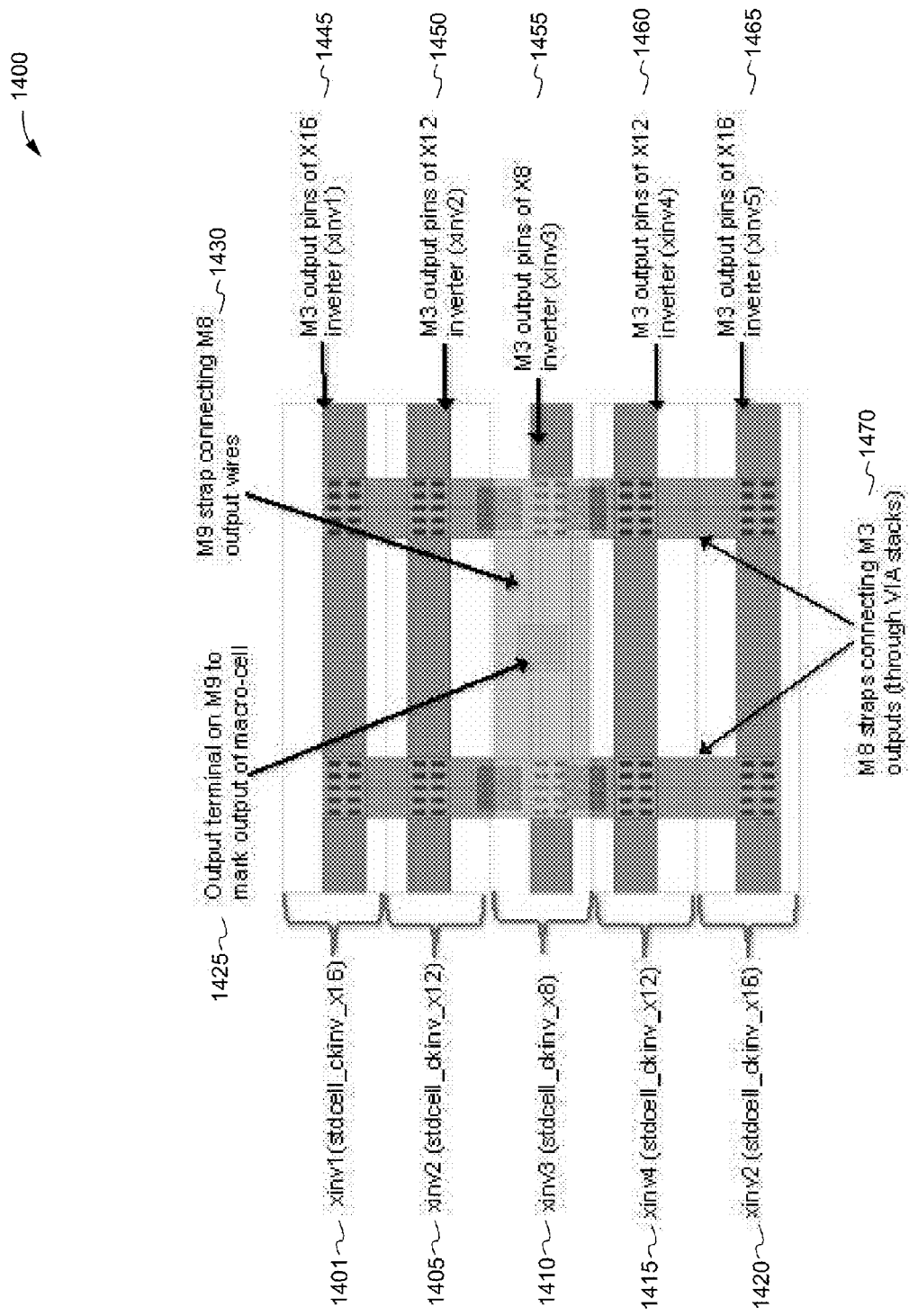
FIG. 14 is a schematic illustrating output routing for a macrocell in accordance with one embodiment of the invention.

FIGS. 13 and 14 are structures 1300 and 1400 used to illustrate input routing 1300 and output routing 1400, respectively, in accordance with one embodiment of the invention. The structure 1300 shows standard cells of drive strengths 16× (1301 and 1320), 12× (1305 and 1315), and 8× (1310), VIA34 vias (1380) connecting M3 input pins to and M4 strap, and an input terminal (1390) on M4 marked as an input of the macrocell. The structure 1400 shows standard-size cells of drive strengths 16× (1401 and 1420), 12× (1405 and 1415), and 8× (1410), output pins of the 16× inverters 1445 and 1465), 12× inverters (1450 and 1460), and 8× inverter (1455), M8 straps connecting M3 outputs through VIA stacks (1470), an M9 strap connecting M8 output wires (1430), and an output terminal on M9 (1425) marked as an output of the macrocell.

In the examples of FIGS. 13 and 14, the base cells in the macrocell are placed in a single column with each base cell placed on top of another. Alternative arrangements are also possible but require different input and output routing patterns. All macrocells will have the same (or similar) routing pattern since the placement of each base cell (and hence the input and output pins) within the macrocell is the same relative to the (X, Y) coordinate embedded in the instance name of the macrocell.

FIGS. 13 and 14 show how inverters are able to be placed and routed together using physical location information embedded in the instance names and have them logically behave like one macrocell, but be represented in the physical DB as multiple base cells. This structure is also able to be extended to other cells as well, including buffers or any other logic gate. Tune-able buffers or clock-driving elements can also be placed and routed in this way.

Hardware Components

Figure 15:
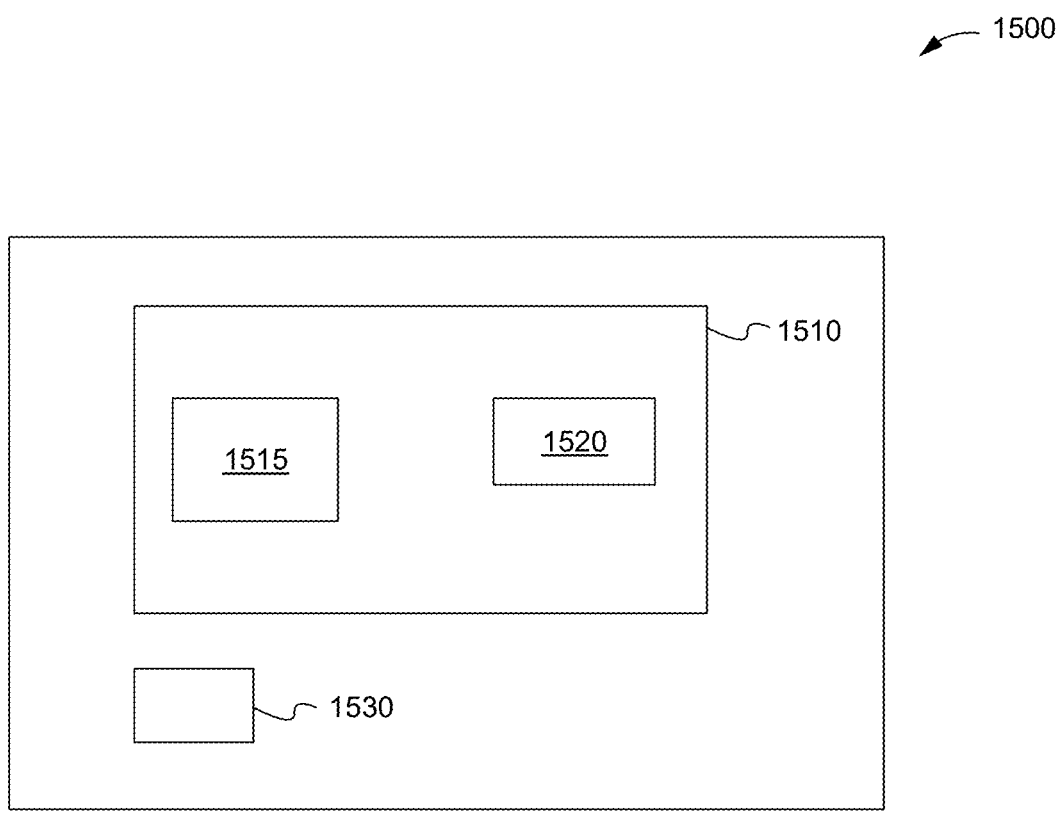
FIG. 15 is a block diagram of a design tool for performing the digital design flow in accordance with one embodiment of the invention.

FIG. 15 is a block diagram of an electronic design tool 1500 in accordance with one embodiment of the invention. Referring to FIGS. 7, 8, 11, and 12 the electronic design tool 1500 includes a processor 1530 and a memory 1510. The memory 1510 stores a computer-readable medium containing computer-executable instructions 1515 for performing the steps 700, 800, 1100, and 1200, and an area 1520 containing the data 750, 755, 760, 765, and 770.

In operation, an electronic design tool is used to fabricate a semiconductor device that includes a clock distribution network. The loads on the sequential elements on the clock distribution network are determined and the drive strengths are determined to reduce skew on the clock distribution network. The inverters on the clock distribution network are fabricated from standardized or "base" cells from a standard cell library, thereby reducing the cost and manufacturing time for fabricating the clock distribution network and thus the semiconductor device as a whole. Advantageously, these base cells can be used to "tune" the drive strengths within a range of values.

During placement and routing, macrocells containing the base cells are instantiated, and the (X,Y) coordinate information are extracted from the instance name. The base cells within the macrocells are then placed at fixed relative locations/offsets from the (X,Y) coordinates. Next, the macrocells are routed by generating collections of macro-cells instantiated in the clock-station design, extracting (X,Y) coordinate information from the instance name, getting the pin locations for each base cell, calculating locations of the pins using the (X,Y) coordinate information, creating physical routes to connect input pins to base cells within a macrocell to each other and marking one or more locations with terminals to help connecting the inputs of the macrocells together, generating physical routes to connect the output pins of all the base cells within a macrocell to each other and marking one or more locations with terminals to help with connecting the outputs of macrocells together, connecting macrocell inputs and outputs per connectivity in the netlist, and balancing route lengths to maintain low skew.

Methods and apparatus for combining standard-size cells and placing and routing clock stations in accordance with the invention are described in U.S. patent application Ser. No. 14/141,076, filed Dec. 26, 2013 and entitled "System for and Method of Combining CMOS Inverters of Multiple Drive Strengths to Create Tune-able Clock Inverters of Variable Drive Strengths in Hybrid Tree-Mesh Clock Distribution Networks," by N. Jayakumar et al., and U.S. patent application Ser. No. 14/141,104, filed Dec. 26, 2013 and entitled "System for and Method of Tuning Clock Networks Constructed Using Variable Drive-Strength Clock Inverters With Variable Drive-Strength Clock Drivers Built Out of a Smaller Subset of Base Cells," by N. Jayakumar et al., both of which are incorporated by reference in their entireties.

While this description explains different embodiments of the invention, it will be appreciated that these embodiments are able to be combined in any number of combinations. The embodiments given above are shown merely for illustration and are not meant to limit the scope of the invention. It will be readily apparent to one skilled in the art that other modifications may be made to the embodiments without departing from the spirit and scope of the invention as defined by the appended claims.

We claim:

1. A method of generating macrocells of a semiconductor device according to an integrated circuit design including a hybrid tree mesh clock distribution network, the method comprising:
   generating with a computing device and storing on a non-transitory computer-readable medium, a collection of macrocells instantiated in the integrated circuit design, wherein instance names of the macrocells include placement information for placing the macrocells in a layout of the integrated circuit design, and further wherein each of the macrocells includes one or more corresponding base cells;
   determining target drive strengths of clock signals for multiple sequential components on the semiconductor device;
   determining groups of standard-size clock-driving elements, wherein each of the standard-size clock-driving elements corresponds to one of the base cells and each of the groups has a drive strength equal to one of the target drive strengths;
   combining the clock-driving elements into the groups;
   extracting with the computing device, from each of the instance names of the macrocells on the non-transitory computer-readable medium, the corresponding placement information; and
   distributing the clock signals having the target drive strengths on the semiconductor device with the groups of clock-driving elements as the groups form the hybrid tree mesh clock distribution network of the semiconductor device.

2. The method of claim 1, further comprising placing the macrocells on the semiconductor device of the integrated circuit based on the placement information.

3. The method of claim 2, wherein placing the macrocells comprises, for each of the macrocells, placing the base cells of the macrocell at fixed locations relative to each other based on the corresponding placement information.

4. The method of claim 3, wherein the placement information comprises (X,Y) coordinates, and the fixed locations are fixed locations from the (X,Y) coordinates.

5. The method of claim 4, wherein the fixed locations are in a same row of a layout of the integrated circuit design.

6. The method of claim 4, wherein the fixed locations are in different rows of a layout of the integrated circuit design.

7. The method of claim 4, wherein the fixed locations in both a same and different rows of a layout of the integrated circuit design.

8. The method of claim 5, wherein the macrocells form clock stations on a clock-distribution network.

9. The method of claim 8, wherein the clock-distribution network comprises the hybrid tree-mesh clock-distribution network.

10. The method of claim 9, wherein the placement information further comprises a level number corresponding to a level of a macrocell in a clock station of the clock-distribution network.

11. The method of claim 1, wherein the base cells comprises inverters, buffers, integrated clock-driving cells, complex logic functions, or any combination thereof.

12. The method of claim 1, wherein drive strengths of the standard-size clock-driving elements comprise 8×, 12×, and 16×, and drive strengths of the groups range from 0× to 64×.

13. A method of placing macrocells of a semiconductor device according to an integrated circuit design including a hybrid tree mesh clock distribution network, the method comprising:
   generating with a computing device and storing on a non-transitory computer-readable medium, a collection of macrocells instantiated in the integrated circuit design, wherein instance names of the macrocells include placement information for placing the macrocells in a layout of the integrated circuit design, and further wherein each of the macrocells includes one or more corresponding base cells;
   extracting with the computing device, from each of the instance names of the macrocells on the non-transitory computer-readable medium, the corresponding placement information;
   placing the macrocells of the non-transitory computer-readable medium with the computing device based on the placement information;
   determining target drive strengths of clock signals for multiple sequential components on the semiconductor device;
   determining combinations of standard-size clock-driving elements, wherein each of the standard-size clock-driving elements corresponds to one of the base cells, each of the groups having a group drive strength equal to a sum of the drive strengths of the clock-driving elements in the group, each of the group drive strengths substantially equal to one of the target drive strengths;
   combining the clock-driving elements into the groups; and
   distributing the clock signals having the target drive strengths on the semiconductor device with the groups of clock-driving elements as the groups form the hybrid tree mesh clock distribution network of the semiconductor device.

14. A non-transitory computer-readable medium, the medium comprising:

computer executable instructions which when executed by computing device perform a method of controlling placement of base cells of a collection of macrocells on a semiconductor device according to an integrated circuit design including a hybrid tree mesh clock distribution network, the method comprising:

generating the collection of the macrocells instantiated in the integrated circuit design, wherein instance names of the macrocells include placement information for placing the macrocells in a layout of the integrated circuit design;

determining target drive strengths of clock signals for multiple sequential components on the semiconductor device;

extracting the placement information from the instance names of the macrocells;

grouping standard-size clock-driving elements into groups such that clock signal drive strengths of each of the groups corresponds to one of the target drive strengths of the multiple sequential components on the semiconductor device, wherein each of the standard-size clock-driving elements corresponds to one of the base cells; and distributing the clock signals having the target drive strengths on the semiconductor device with the groups as the groups form the hybrid tree mesh clock distribution network of the semiconductor device.

15. The computer-readable medium of claim 14, wherein the method further comprises placing the base cells in pre-determined relative arrangement on the semiconductor device of an integrated circuit based on the placement information.

16. The computer-readable medium of claim 15, wherein the placement information comprises an (X,Y) coordinate.

17. The computer-readable medium of claim 16, wherein the pre-determined relative arrangement comprises pre-determined locations relative to the (X,Y) coordinate.

18. The computer-readable medium of claim 17, wherein the locations are all in a single column of a layout of the integrated circuit.

19. The computer-readable medium of claim 14, wherein the computer executable instructions are further configured to generate physical routes to connect input pins and output pins of the base cells.

20. The computer-readable medium of claim 19, wherein the computer executable instructions are further configured to mark first and second terminals and to couple all input pins of the base cells to the first terminal and to couple all output pins of the base cells to the second terminal according to connectivity in a netlist.

21. The computer-readable medium of claim 20, wherein the computer executable instructions are further configured to balance lengths of the routes to maintain skew in the integrated circuit within a pre-determined range.

22. The computer-readable medium of claim 14, wherein the macrocells are all standard-size macrocells.

23. The computer-readable medium of claim 14, wherein the base cells comprise inverters, buffers, integrated clock-driving cells, complex logic functions, or any combinations thereof.

* * * * *